US011319419B2

(12) United States Patent
Chen et al.

(10) Patent No.: US 11,319,419 B2
(45) Date of Patent: May 3, 2022

(54) MULTILAYER POLYOLEFIN GREENHOUSE FILMS WITH HIGH TRANSPARENCY

(71) Applicant: Dow Global Technologies LLC, Midland, MI (US)

(72) Inventors: Yong Chen, Shanghai (CN); Xiaobing Yun, Shanghai (CN); Libo Du, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 247 days.

(21) Appl. No.: 16/612,003

(22) PCT Filed: May 11, 2017

(86) PCT No.: PCT/CN2017/083934
§ 371 (c)(1),
(2) Date: Nov. 8, 2019

(87) PCT Pub. No.: WO2018/205220
PCT Pub. Date: Nov. 15, 2018

(65) Prior Publication Data
US 2020/0165396 A1  May 28, 2020

(51) Int. Cl.
B32B 27/30  (2006.01)
B32B 27/32  (2006.01)
B32B 27/18  (2006.01)
B32B 27/08  (2006.01)
C08J 5/18   (2006.01)
C08L 23/06  (2006.01)
C08L 23/08  (2006.01)
C08K 5/00   (2006.01)

(52) U.S. Cl.
CPC .......... *C08J 5/18* (2013.01); *C08L 23/06* (2013.01); *C08L 23/0869* (2013.01); *C08J 2323/12* (2013.01); *C08K 5/005* (2013.01); *C08L 2203/16* (2013.01); *C08L 2207/062* (2013.01); *C08L 2207/066* (2013.01)

(58) Field of Classification Search
None
See application file for complete search history.

(56) References Cited

U.S. PATENT DOCUMENTS

| | | |
|---|---|---|
| 3,645,992 A | 2/1972 | Elston |
| 3,914,342 A | 10/1975 | Mitchell |
| 4,076,698 A | 2/1978 | Anderson et al. |
| 4,599,392 A | 7/1986 | McKinney et al. |
| 5,272,236 A | 12/1993 | Lai et al. |
| 5,278,272 A | 1/1994 | Lai et al. |
| 5,582,923 A | 12/1996 | Kale et al. |
| 5,733,155 A | 3/1998 | Sagawa |
| 5,854,045 A | 12/1998 | Fang et al. |
| 9,126,269 B2 | 9/2015 | Ohlsson et al. |
| 9,296,182 B2 | 3/2016 | Vinck et al. |
| 2012/0100356 A1 | 4/2012 | Ohlsson et al. |
| 2014/0255674 A1* | 9/2014 | Tice ............ B32B 27/306 428/213 |
| 2015/0258755 A1* | 9/2015 | Kauschke ......... B32B 5/022 428/219 |

FOREIGN PATENT DOCUMENTS

| | | |
|---|---|---|
| CN | 101045353 A | 10/2007 |
| CN | 102145564 A | 8/2011 |
| CN | 102886950 A | 1/2013 |
| CN | 103042782 A | 4/2013 |
| CN | 103125308 A | 6/2013 |
| CN | 103538333 A | 1/2014 |
| CN | 104943299 A | 9/2015 |
| CN | 105623069 A | 6/2016 |
| CN | 106613503 A | 5/2017 |
| JP | H0890732 A | 4/1996 |
| JP | 2000188966 A | 7/2000 |
| JP | 2000246852 A | 9/2000 |
| JP | 2002355937 A | 12/2002 |
| JP | 2005047097 A | 2/2005 |
| JP | 2005186320 A | 7/2005 |
| WO | 9739058 A1 | 10/1997 |
| WO | 2004022646 A1 | 3/2004 |
| WO | 2007140854 A1 | 12/2007 |

(Continued)

OTHER PUBLICATIONS

Communication pursuant to Rules 70(2) and 70(a) EPC, dated Oct. 15, 2020, pertaining to European Patent Application No. 17909582.3.
Office Action, dated Oct. 12, 2020, pertaining to Chinese Patent Application No. 201780090563.6.
Office Action, dated Apr. 27, 2021, pertaining to Brazilian Patent Application No. BR112019023630-9.
International Search Report and Written Opinion pertaining to PCT/CN2017/083934, dated Feb. 5, 2018.
Williams et al., "The Construction of a Polyethylene Calibration Curve for Gel Permeation Chromatography Using Polystyrene Fractions", Polymer Letters, 1968, 621-624.
Office Action, dated Aug. 17, 2021, pertaining to Japanese Patent Application No. 2019-561822.

\* cited by examiner

*Primary Examiner* — Sheeba Ahmed
(74) *Attorney, Agent, or Firm* — Dinsmore & Shohl LLP

(57) ABSTRACT

A multilayer film (10) having excellent mechanical strength and transparency comprise a core layer (12), at least two skin layers, and at least two sub-skin layers disposed between the core layer (12) and the two skin layers. The core layer (12) comprises at least 60 wt. % linear low density polyethylene (LLDPE). The sub-skin layers comprise at least 60 wt. % low density polyethylene (LDPE). The skin layers comprise at least 80 wt. % of LLDPE wherein the LLDPE comprises C6 LLDPE, C8 LLDPE, or combinations thereof, and each skin layer has a thickness of less than 25% of the overall thickness of the multilayer film (10). The multilayer film (10) comprises at least 0.1 wt. % ultraviolet stabilizer.

13 Claims, 1 Drawing Sheet

(56) References Cited

FOREIGN PATENT DOCUMENTS

| | | |
|---|---|---|
| WO | 2016176356 A1 | 11/2016 |
| WO | 2017004786 A1 | 1/2017 |

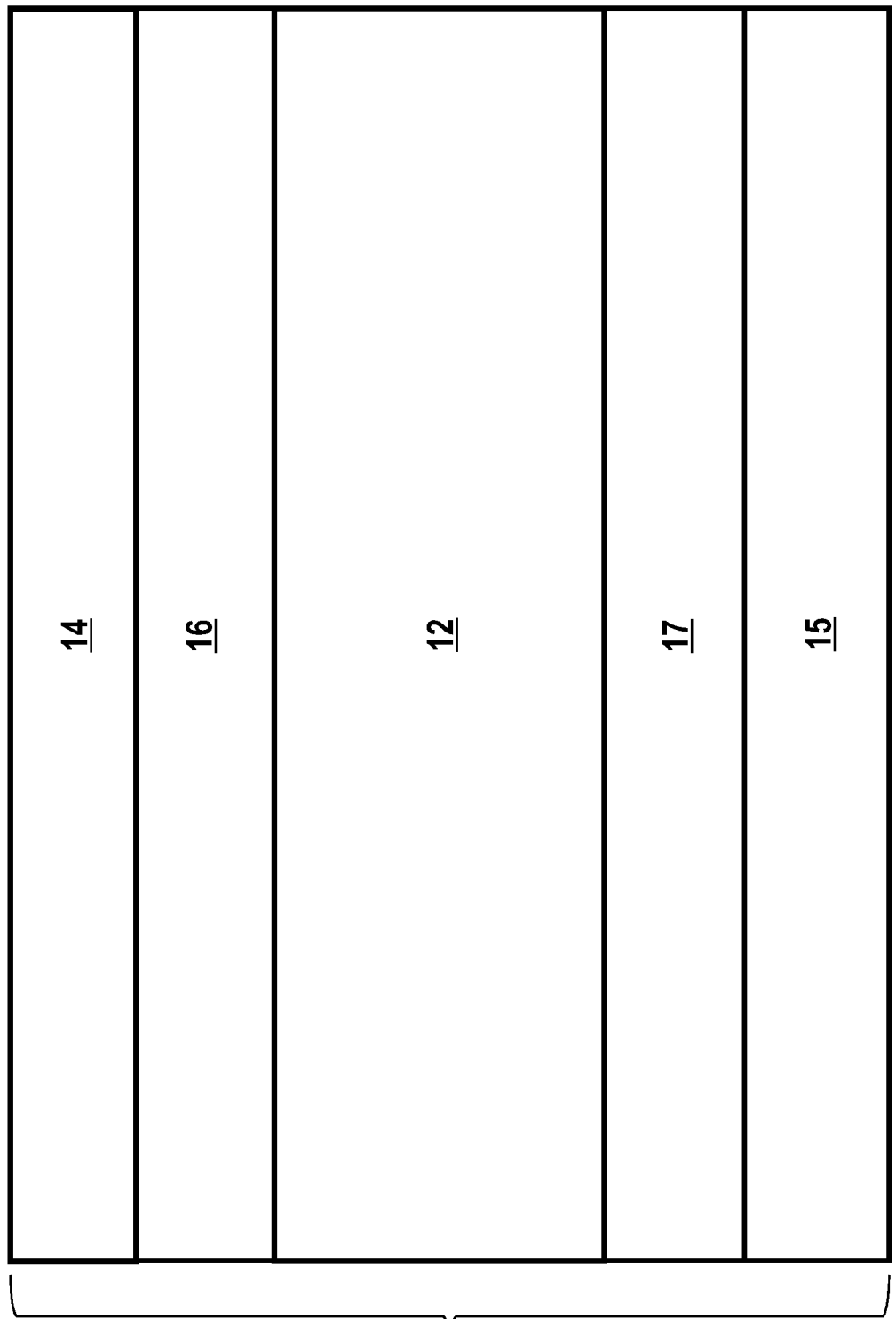

MULTILAYER POLYOLEFIN GREENHOUSE FILMS WITH HIGH TRANSPARENCY

TECHNICAL FIELD

Embodiments described herein relate generally to multilayer polyolefin films and specifically relate to multilayer polyolefin greenhouse films exhibiting excellent transparency and mechanical strength, which makes the films suitable for greenhouse film applications.

BACKGROUND

Greenhouse films are widely used to modulate the environmental conditions, especially the temperature and humidity, and thus to enable the plant growth at higher growth rate and yield. Film clarity is critical especially in cold regions to let enough sunlight come into the greenhouse to raise the in-house temperature especially in the morning time. This enables the temperature in the greenhouse to be sufficient at lower temperature to avoid plant damage and also to increase the plant growth rate and yield at appropriate temperature and humidity. Film mechanical properties, such as tensile strength, tear resistance, toughness, softness, etc., are also very important to ensure service life of the greenhouse films from several months to more than five years.

Accordingly, there is a need for polyolefin greenhouse films that simultaneously provide film clarity and film strength.

SUMMARY

Embodiments of the present disclosure meet those needs by providing a multilayer polyolefin film suitable for use in greenhouse applications, the film having at least a core layer, two skin layers, and two sub-skin layers, wherein the multilayer film has superior optical properties and good mechanical strength compared to conventional greenhouse films.

In accordance with one embodiment, a multilayer film comprising at least 5 layers is provided. The 5 layers comprise a core layer, at least two skin layers, and at least two sub-skin layers disposed between the core layer and the two skin layers. The core layer comprises at least 60 wt. % linear low density polyethylene (LLDPE) having a density of 0.900 to 0.945 g/cc and a melt index ($I_2$) from 0.5 to 2.0 g/10 min when measured according to ASTM D1238 at 190° C. and 2.16 kg load. The sub-skin layers comprise at least 60 wt. % low density polyethylene (LDPE) having a density of 0.912 to 0.935 g/cc, a melt index, $I_2$, from 0.15 to 2.0 g/10 min. The skin layers comprise at least 80 wt. % LLDPE having a density of from 0.900 to 0.945 g/cc and a melt index, $I_2$, from 0.5 to 2.0 g/10 min, wherein LLDPE comprises C6 LLDPE, C8 LLDPE, or combinations thereof. Each skin layer has a thickness of less than 25% of the overall thickness of the multilayer film. Moreover, the multilayer film comprises at least 0.1 wt. % ultraviolet (UV) stabilizer.

These and other embodiments are described in more detail in the following Detailed description.

BRIEF DESCRIPTION OF THE DRAWINGS

The following detailed description of specific embodiments of the present disclosure can be best understood when read in conjunction with the following drawing, where like structure is indicated with like reference numerals and in which:

FIG. 1 is a schematic view of the multilayer film according to one or more embodiments of the present disclosure.

DETAILED DESCRIPTION

Specific embodiments of the present application will now be described. The disclosure may, however, be embodied in different forms and should not be construed as limited to the embodiments set forth in this disclosure. Rather, these embodiments are provided so that this disclosure will be thorough and complete, and will fully convey the scope of the subject matter to those skilled in the art.

Definitions

The term "polymer" refers to a polymeric compound prepared by polymerizing monomers, whether of the same or a different type. The generic term polymer thus embraces the term "homopolymer," usually employed to refer to polymers prepared from only one type of monomer as well as "copolymer" which refers to polymers prepared from two or more different monomers. The term "interpolymer," as used herein, refers to a polymer prepared by the polymerization of at least two different types of monomers. The generic term interpolymer thus includes copolymers, and polymers prepared from more than two different types of monomers, such as terpolymers.

"Polyethylene" or "ethylene-based polymer" shall mean polymers comprising greater than 50% by weight of units which have been derived from ethylene monomer. This includes polyethylene homopolymers or copolymers (meaning units derived from two or more comonomers). Common forms of polyethylene known in the art include Low Density Polyethylene (LDPE); Linear Low Density Polyethylene (LLDPE); Ultra Low Density Polyethylene (ULDPE); Very Low Density Polyethylene (VLDPE); single-site catalyzed Linear Low Density Polyethylene, including both linear and substantially linear low density resins (m-LLDPE); Medium Density Polyethylene (MDPE); and High Density Polyethylene (HDPE).

The term "ULDPE" is defined as a polyethylene-based copolymer having a density in the range of 0.895 to 0.915 g/cc.

The term "LDPE" may also be referred to as "high pressure ethylene polymer" or "highly branched polyethylene" and is defined to mean that the polymer is partly or entirely homopolymerized or copolymerized in autoclave or tubular reactors at pressures above 14,500 psi (100 MPa) with the use of free-radical initiators, such as peroxides (see for example U.S. Pat. No. 4,599,392, incorporated herein by reference).

The term "LLDPE", includes both resin made using the traditional Ziegler-Natta catalyst systems as well as single-site catalysts such as metallocenes (sometimes referred to as "m-LLDPE"). LLDPEs contain less long chain branching than LDPEs and include the substantially linear ethylene polymers which are further defined in U.S. Pat. Nos. 5,272, 236, 5,278,272, 5,582,923 and 5,733,155; the homogeneously branched linear ethylene polymer compositions such as those in U.S. Pat. No. 3,645,992; the heterogeneously branched ethylene polymers such as those prepared according to the process disclosed in U.S. Pat. No. 4,076, 698; and/or blends thereof (such as those disclosed in U.S. Pat. No. 3,914,342 or 5,854,045). The LLDPE can be made via gas-phase, solution-phase or slurry polymerization or any combination thereof, using any type of reactor or reactor configuration known in the art, including but not limited to gas and solution phase reactors.

The term "C6 LLDPE" refers to ethylene based polymers produced from ethylene monomer and hexene comonomer. Similarly, "C4 LLDPE" refer to ethylene based polymers produced from ethylene monomer and butene comonomer, and "C8 LLDPE" refers to ethylene based polymers produced from ethylene monomer and octene comonomer.

The term "HDPE" refers to polyethylenes having densities greater than about 0.940 g/cc, which are generally prepared with Ziegler-Natta catalysts, chrome catalysts or even metallocene catalysts.

The term "propylene-based polymer," as used herein, refers to a polymer that comprises, in polymerized form, a majority amount of propylene monomer (based on the total weight of the polymer) and optionally may comprise at least one polymerized comonomer.

"Multilayer film" means any structure having more than one layer. For example, the multilayer structure may have five or more layers.

Reference will now be made in detail to multilayer film embodiments of the present disclosure, specifically films used in greenhouse film applications.

Embodiments are directed to a multilayer film comprising at least 5 layers. Referring to FIG. 1, the 5-layer multilayer film 10 comprise a core layer 12, at least two skin layers 14 and 15, and at least two sub-skin layers 16 and 17 disposed between the core layer 12 and the two skin layers 14 and 15.

The core layer 12 may comprise at least 60 wt. % linear low density polyethylene (LLDPE) having a density of 0.900 to 0.945 g/cc and a melt index ($I_2$) from 0.5 to 2.0 g/10 min when measured according to ASTM D1238 at 190° C. and 2.16 kg load. The sub-skin layers 16 and 17 may comprise at least 60 wt. % low density polyethylene (LDPE) having a density of 0.912 to 0.935 g/cc, a melt index, $I_2$, from 0.15 to 2.0 g/10 min. The skin layers 14 and 15 comprise at least 80 wt. % of LLDPE having a density of from 0.900 to 0.945 g/cc and a melt index, $I_2$, from 0.5 to 2.0 g/10 min, wherein LLDPE is C6 LLDPE, C8 LLDPE, or combinations thereof. Each skin layer 14 and 15 has a thickness of less than 25% of the overall thickness of the multilayer film. The multilayer film comprises at least 0.1 wt. % ultraviolet (UV) stabilizer.

Core Layer

As stated above, the core layer comprises at least 60 wt. % LLDPE, however, in further embodiments, the core layer may comprise at least 70 wt. % LLDPE, at least 80 wt. % LLDPE, or at least 90 wt. % LLDPE, or at least 95 wt. % LLDPE, or 100 wt. % LLDPE. In one or more embodiments, the LLDPE of the core layer may comprise a density of 0.900 to 0.945 g/cc, 0.905 to 0.935 g/cc, or from 0.910 to 0.930 g/cc, or from 0.915 to 0.925 g/cc. The melt index ($I_2$) of the LLDPE may be from 0.5 to 2.0 g/10 min, or from 0.75 to 1.5 g/10 min, or from 0.75 to 1.0 g/10 min.

In additional embodiments, the LLDPE of the core layer may comprise C4 LLDPE, C6 LLDPE, C8 LLDPE, or combinations thereof. In one embodiment, the LLDPE of the core layer is C6 LLDPE. Suitable commercial LLDPE products may include DOWLEX™ 2645 G, a C6 LLDPE from The Dow Chemical Company (Midland, Mich.).

In further embodiments, it is contemplated to include additional components in the core layer, such as additional ethylene-based polymers. These may include but are not limited to, MDPE, HDPE, LDPE, or combinations thereof.

The HDPE may have a density of 0.945 to 0.965 g/cc and a melt index ($I_2$) from 0.5 to 5.0 g/10 min.

Sub-Skin Layers

As stated above, the sub-skin layers comprise at least 60 wt. % LDPE, however, in further embodiments, the sub-skin layers may comprise at least 70 wt. % LDPE, at least 80 wt. % LDPE, or at least 90 wt. % LDPE, or at least 95 wt. % LDPE, or 100 wt. % LDPE.

The LDPE of the sub-skin layers may have a density of 0.912 to 0.935 g/cc, or from 0.915 to 0.925 g/cc, or from 0.920 to 0.925 g/cc. In one or more embodiments, the LDPE of the sub-skin layers may have a melt index, $I_2$, from 0.15 to 2.0 g/10 min, or from 0.2 to 1.0 g/10 min, or from 0.5 to 1.0 g/10 min, or from 0.25 to 0.75 g/10 min.

The LDPEs may be well-known, commercially available LDPEs, and may be made by any one of a variety of processes, such as those described above. Commercially available LDPEs include but are not limited to LDPEs available under the tradenames DOW™ LDPE 150E and DOW™ LDPE 310E, from The Dow Chemical Company (Midland, Mich.).

Like the core layer, it is contemplated to include additional components in the sub-skin layers, such as additional ethylene-based polymers. These may include but are not limited to, MDPE, HDPE, LLDPE, or combinations thereof.

Skin Layers

As stated above, the skin layer comprises at least 80 wt. % LLDPE, however, in further embodiments, the skin layer may comprise at least 90 wt. % LLDPE, at least 95 wt. %, or 100 wt. % LLDPE. In one more embodiments, the LLDPE of the skin layer may comprise a density of 0.900 to 0.945 g/cc, 0.905 to 0.935 g/cc, or from 0.910 to 0.930 g/cc, or from 0.915 to 0.925 g/cc. The melt index ($I_2$) of the LLDPE may be from 0.5 to 2.0 g/10 min, or from 0.75 to 1.5 g/10 min, or from 0.75 to 1.0 g/10 min.

In one or more embodiments, the LLDPE of the skin layers may comprise C6 LLDPE, C8 LLDPE, or combinations thereof. As stated above, the core layer may include C4 LLDPE; however, it was surprisingly discovered that the inclusion of C6 LLDPE and C8 LLDPE in the skin instead of C4 LLDPE yields improved optical and strength properties in the multilayer film. In one embodiment, the LLDPE of the skin layer is C6 LLDPE. Suitable commercial LLDPE products may include DOWLEX™ 2645 G from The Dow Chemical Company (Midland, Mich.).

UV Stabilizer

Additionally, various UV stabilizers are contemplated as suitable. In one embodiment, UV stabilizer is included in the skin layer; however, it is contemplated that the UV stabilizer may be included in other layers of the multilayer film. In one embodiment, the UV stabilizer includes Hindered Amine Light Stabilizers (HALS). HALS are long-term thermal stabilizers that act by trapping free radicals formed during the photo-oxidation of plastic materials, thereby limiting the photo-degradation process. The ability of HALS to scavenge radicals created by UV absorption is explained by the formation of nitroxyl radicals through a process known as the Denisov Cycle. One suitable commercial example of the HALS UV stabilizer is Chimassorb 944 (CAS #71878-19-8) from BASF, with the structure below:

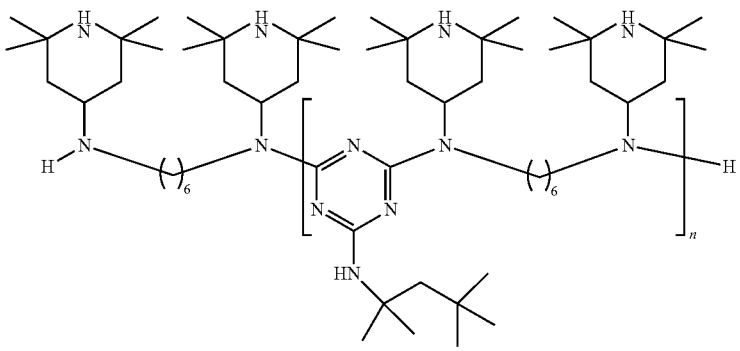

Multilayer Film

While various components and amounts are contemplated for the multilayer film, the key components are LDPE and LLDPE. In one or more embodiments, the multilayer film comprises from 15 to 50 wt. % LDPE. In another embodiment, the multilayer film may comprise from 50 to 85 wt. % LLDPE. Additionally, while the multilayer films are primarily polyethylene-based, the multilayer film may, in some embodiments, include propylene-based polymer. In alternative embodiments, the multilayer film may be substantially free of propylene-based polymer. As used herein, "substantially" means less than 0.5 wt. %, or less than 0.1 wt. % of propylene-based polymers.

In conventional greenhouse films, ethylene vinyl acrylate is commonly used. In optional embodiments of the present disclosure, ethylene vinyl acrylate may be included in one or more layers of the present multilayer film. In further embodiments, the multilayer film may comprise an additional layer comprising ethylene vinyl acrylate. However, in other embodiments of the present disclosure, the core layer, the sub-skin layers, and the skin layers may be substantially free of acrylate polymers, such as ethylene vinyl acrylate. As used herein, "substantially" means less than 0.5 wt. %, or less than 0.1 wt. % of the acrylate polymers.

Further, other additives may be included in the multilayer film, such as antioxidants, UV absorbers, infrared (IR) absorber, anti-fogging agents, and anti-dripping agents.

While the discussion of the multilayer films in this application focused on 5 layer films, films having more than 5 layers are also contemplated. Additionally, various thicknesses are contemplated for the multilayer films. For example, the multilayer film may have an overall thickness from 50 to 150 µm, or from 50 to 100 µm. As stated above, each skin layer may have a thickness of less than 25% of the overall thickness of the multilayer film. Without being limited to theory, the skin layers comprising C6 LLDPE or C8 LLDPE at this thickness range plays a significant role in providing the desired optical properties for the greenhouse film while also providing the desired strength to the multilayer film.

Referring to the optical properties, the multilayer film may exhibits a haze less than 10% at an overall thickness of 80 µm as measured according to ASTM D1003. Moreover, the multilayer film may exhibit a clarity greater than 95% at an overall thickness of 80 µm.

Testing Methods

The test methods used in the application and the following examples are included below.

Melt Index ($I_2$)

Melt index ($I_2$) were measured in accordance to ASTM D-1238 at 190° C. at 2.16 kg. The values are reported in g/10 min, which corresponds to grams eluted per 10 minutes.

Density

Density is measured according to ASTM D792 in grams/cubic centimeter (g/cc or $g/cm^3$), and the samples were prepared by compression molding following ASTM D4703.

Conventional Gel Permeation Chromatography (Conv. GPC)

A GPC-IR high temperature chromatographic system from PolymerChar (Valencia, Spain), was equipped with a Precision Detectors (Amherst, Mass.), 2-angle laser light scattering detector Model 2040, an IR5 infra-red detector and a 4-capillary viscometer, both from PolymerChar. Data collection was performed using PolymerChar Instrument Control software and data collection interface. The system was equipped with an on-line, solvent degas device and pumping system from Agilent Technologies (Santa Clara, Calif.).

Injection temperature was controlled at 150 degrees Celsius. The columns used, were three, 10-micron "Mixed-B" columns from Polymer Laboratories (Shropshire, UK). The solvent used was 1,2,4-trichlorobenzene. The samples were prepared at a concentration of "0.1 grams of polymer in 50 milliliters of solvent." The chromatographic solvent and the sample preparation solvent each contained "200 ppm of butylated hydroxytoluene (BHT)." Both solvent sources were nitrogen sparged. Ethylene-based polymer samples were stirred gently at 160 degrees Celsius for three hours. The injection volume was "200 microliters,' and the flow rate was "1 milliliters/minute." The GPC column set was calibrated by running 21 "narrow molecular weight distribution" polystyrene standards. The molecular weight (MW) of the standards ranges from 580 to 8,400,000 g/mole, and the standards were contained in six "cocktail" mixtures. Each standard mixture had at least a decade of separation between individual molecular weights. The standard mixtures were purchased from Polymer Laboratories. The polystyrene standards were prepared at "0.025 g in 50 mL of solvent" for molecular weights equal to, or greater than, 1,000,000 g/mole, and at "0.050 g in 50 mL of solvent" for molecular weights less than 1,000,000 g/mole.

The polystyrene standards were dissolved at 80° C., with gentle agitation, for 30 minutes. The narrow standards mixtures were run first, and in order of decreasing "highest molecular weight component," to minimize degradation. The polystyrene standard peak molecular weights were converted to polyethylene molecular weight using Equation 1 (as described in Williams and Ward, *J. Polym. Sci.*, Polym. Letters, 6, 621 (1968)):

$$M\text{polyethylene} = A \times (M\text{polystyrene})^B \quad \text{(Eqn. 1)},$$

where M is the molecular weight, A is equal to 0.4316 and B is equal to 1.0.

Number-average molecular weight (Mn(conv gpc)), weight average molecular weight (Mw-cony gpc), and z-average molecular weight (Mz(conv gpc)) were calculated according to Equations 2-4 below.

$$Mn(conv\ gpc) = \frac{\sum_{i=RV_{integration\ start}}^{i=RV_{integration\ end}} (IR_{measurment\ channel_i})}{\sum_{i=RV_{integration\ start}}^{i=RV_{integration\ end}} \left(\frac{IR_{measurement\ channel_i}}{M_{PE_i}}\right)} \quad \text{(Eqn. 2)}$$

$$Mw(conv\ gpc) = \frac{\sum_{i=RV_{integration\ start}}^{i=RV_{integration\ end}} (M_{PE_i} IR_{measurement\ channel_i})}{\sum_{i=RV_{integration\ start}}^{i=RV_{integration\ end}} (IR_{measurement\ channel_i})} \quad \text{(Eqn. 3)}$$

$$Mz(conv\ gpc) = \frac{\sum_{i=RV_{integration\ start}}^{i=RV_{integration\ end}} (M_{PE_i}^2 IR_{measurement\ channel_i})}{\sum_{i=RV_{integration\ start}}^{i=RV_{integration\ end}} (M_{PE_i} IR_{measurement\ channel_i})} \quad \text{(Eqn. 4)}$$

In Equations 2-4, the RV is column retention volume (linearly-spaced), collected at "1 point per second," the IR is the baseline-subtracted IR detector signal, in Volts, from the IR5 measurement channel of the GPC instrument, and $M_{PE}$ is the polyethylene-equivalent MW determined from Equation 1. Data calculation were performed using "GPC One software (version 2.013H)" from PolymerChar.

Haze

The haze was measured in accordance with ASTM D1003 using BYK Gardner Haze-gard meter.

Clarity

Clarity is measured in accordance with the BYK test method using a BYK Gardner Haze-gard meter.

Elmendorf Tear Resistance

Elmendorf Tear Resistance is measured in machine direction (MD) and transverse direction (TD) in accordance with ASTM D1922.

Dart Impact Strength

Dart Impact Strength (sometimes termed "dart drop") is measured according to ASTM D1709 Method A, at 26 inches±0.4 inches (66 cm±1 cm) height and polished aluminum hemispherical head of 38.10±0.13 mm in diameter.

Tensile Properties

Tensile strength and elongation at break were measured in the machine direction (MD) and transverse direction (TD) according to ASTM D882.

EXAMPLES

The following examples illustrate features of the present disclosure but are not intended to limit the scope of the disclosure. Table 1 lists the commercial ethylene resins used in the Examples below.

TABLE 1

Commercial Resins Used in the Examples:

| Resins | Type | MI (g/10 min) | Density (g/cc) | Supplier |
| --- | --- | --- | --- | --- |
| DOWLEX ™ 2645G | C6 LLDPE | 0.9 | 0.919 | The Dow Chemical Company (Midland, MI) |
| CEFOR ™ 1211P | C4 LLDPE | 1.0 | 0.918 | The Dow Chemical Company |
| DOW ™ LDPE 150E | LDPE | 0.25 | 0.921 | The Dow Chemical Company |
| DOW ™ LDPE 310E | LDPE | 0.75 | 0.924 | The Dow Chemical Company |

To demonstrate the property difference between C4 LLDPE and C6 LLDPE, monolayer films C4 LLDPE and C6 LLDPE were prepared in an extrusion film line using the process parameters listed in Table 2. Film fabrication was done on an extrusion blown 45 mm Covex line. The monolayer films underwent the strength tests listed in Table 3. As shown in Table 3, the monolayer film prepared with C6 LLDPE showed much better physical properties compared to the monolayer film comprising C4 LLDPE.

TABLE 2

Monolayer film fabrication conditions

| | |
| --- | --- |
| Blow Up Ratio | 2.5 |
| Die gap | 1.5 mm |
| Output rate | 22.5 Kg/h |
| Monolayer Film Thickness | 50 μm |

TABLE 3

Physical properties of the monolayer films prepared with C4 LLDPE comonomer and C6 LLDPE comonomer

| Monolayer Film | Haze (%) | Tensile strength at break (MPa) @ MD | Tensile strength at break (MPa) @ TD | Tensile elongation at break (%) @ MD | Tensile elongation at break (%) @ TD | Elmendorf tear resistance (g) @ MD | Elmendorf tear resistance (g) @ TD | Dart impact resistance Type A (8) |
|---|---|---|---|---|---|---|---|---|
| C4 LLDPE CEFOR ™ 1211P | 17.0 | 26.0 | 22.0 | 650 | 1031 | 180 | 460 | 170 |
| C6 LLDPE DOWLEX ™ 2645G | 14.0 | 31.0 | 31.5 | 570 | 922 | 780 | 1020 | 470 |

5-Layer Multilayer Film Examples

Example 5-layer blown films as listed in Table 5 were fabricated on a 5-layer co-extrusion blown film line using the fabrication conditions listed in Table 4.

TABLE 4

| Multilayer film fabrication conditions | |
|---|---|
| Screw diameter | 30 mm |
| Die diameter | 120 mm |
| Barrel temperature | 180-205° C. |
| Blow Up Ratio | 2.3 |
| Lay flat width | 430 mm |
| Multilayer Film Thickness | 80 μm |

The film layer ratio of the multilayer films were controlled by the screw speed of each extruder and confirmed by checking the film cross-section surface via microscopy.

TABLE 5

Five layer blown films and their physical properties

| | Comparative Example 1 | Comparative Example 2 | Comparative Example 3 | Comparative Example 4 | Example 1 | Example 2 |
|---|---|---|---|---|---|---|
| Skin layer | DOWLEX ™ 2645G 33% + CEFOR ™ 1211P 33% + LDPE 150E 33% | DOWLEX ™ 2645G 33% + CEFOR ™ 1211P 33% + LDPE 310E 33% | CEFOR ™ 1211P 100% | DOWLEX ™ 2645G 100% | DOWLEX ™ 2645G 100% | DOWLEX ™ 2645G 100% |
| Sub-skin layer | DOWLEX ™ 2645G 33% + CEFOR ™ 1211P 33% + LDPE 150E 33% | DOWLEX ™ 2645G 33% + CEFOR ™ 1211P 33% + LDPE 310E 33% | CEFOR ™ 1211P 100% | LDPE 310E 100% | LDPE 310E 100% | LDPE 150E 100% |
| Core layer | DOWLEX ™ 2645G 33% + CEFOR ™ 1211P 33% + LDPE 150E 33% | DOWLEX ™ 2645G 33% + CEFOR ™ 1211P 33% + LDPE 310E 33% | LDPE 150E 100% | CEFOR ™ 1211P 100% | CEFOR ™ 1211P 100% | CEFOR ™ 1211P 100% |
| Sub-skin layer | DOWLEX ™ 2645G 33% + CEFOR ™ 1211P 33% + LDPE 150E 33% | DOWLEX ™ 2645G 33% + CEFOR ™ 1211P 33% + LDPE 310E 33% | CEFOR ™ 1211P 100% | LDPE 310E 100% | LDPE 310E 100% | LDPE 150E 100% |
| Skin layer composition | DOWLEX ™ 2645G 33% + CEFOR ™ 1211P 33% + LDPE 150E 33% | DOWLEX ™ 2645G 33% + CEFOR ™ 1211P 33% + LDPE 310E 33% | CEFOR ™ 1211P 100% | DOWLEX ™ 2645G 100% | DOWLEX ™ 2645G 100% | DOWLEX ™ 2645G 100% |
| Layer ratio (skin:sub-skin:core:sub-skin:skin) | 1:1:2:1:1 | 1:1:2:1:1 | 1:1:2:1:1 | 3.5:1:1:1:3.5 | 1:1:2:1:1 | 1:1:2:1:1 |

TABLE 5-continued

Five layer blown films and their physical properties

|  | Comparative Example 1 | Comparative Example 2 | Comparative Example 3 | Comparative Example 4 | Example 1 | Example 2 |
|---|---|---|---|---|---|---|
| Layer Thickness (um) (skin:sub-skin: core:sub-skin: skin), total 80 um | 13/13/28/13/13 | 13/13/28/13/13 | 13/13/28/13/13 | 28/8/8/8/28 | 13/13/28/13/13 | 13/13/28/13/13 |
| Haze (%) | 20.5 | 11.5 | 11.3 | 10.4 | 6.9 | 8.9 |
| Clarity (%) | 74.4 | 90.9 | 98.7 | 99.2 | 98.6 | 96.6 |
| Tensile strength at break (MPa) @ MD | 32.4 | 29.5 | 21.0 | 35.8 | 25.0 | 26.4 |
| Tensile strength at break (MPa) @ TD | 29.6 | 30.6 | 25.4 | 38.1 | 29.7 | 27.6 |
| Tensile elongation at break (%) @ MD | 843 | 858 | 692 | 948 | 623 | 731 |
| Tensile elongation at break (%) @ TD | 1031 | 922 | 952 | 1105 | 836 | 968 |
| Elmendorf tear resistance (g) @ MD | 222 | 281 | 347 | 1051 | 437 | 507 |
| Elmendorf tear resistance (g) @ TD | 1102 | 1153 | 427 | 1237 | 1158 | 981 |
| Dart impact resistance Type A (g) | 314 | 284 | 327 | 507 | 321 | 426 |

As shown in Table 5, comparative examples 1 and 2, which both include blends of C4 LLDPE, C6 LLPDE, and LDPE in each layer, demonstrated undesirable optical properties. Comparative example 1, which utilized LDPE with a melt index $I_2$ of 0.25 MI, exhibited poor film transparency as indicated by high haze and low clarity values. Specifically, comparative example 1 exhibited high film haze (20.5%) and low clarity (74.4%), which is undesirable for greenhouse film applications. Compared to the comparative example 1, the substitution of low MI LDPE (0.25 MI) with higher melt index LDPE ($I_2$=0.75) in comparative example 2 improved film optical properties as compared to comparative example 1. However, optical properties were still undesirable as indicated by the high film haze (11.5%) and low clarity (90.9%), which is not preferred for greenhouse film applications.

Comparative example 3, which included LDPE ($I_2$=0.25) in the core layer, and C4 LLDPE in the sub-skin layers and skin layers, demonstrated improved film optical properties as compared to comparative example 1 and 2. However, optical properties were still undesirable as indicated by the high film haze (11.3%). Moreover, the film tensile strength was the lowest of the test films which is undesirable for greenhouse film applications.

Comparative example 4, which included C4 LLDPE in the core layer, LDPE ($I_2$=0.75) in the sub-skin layers, and C6 LLDPE in the skin layers, and a layer ratio of each skin layer is ~35%, exhibited improved film optical properties as compared to comparative example 1, 2 and 3. However, the overall film optics were not desired as indicated by the high film haze (>10.0%). This undesirable haze result was due at least in part to the larger thicknesses of the skin layers.

Example 1, which included C4 LLDPE as core layer, LDPE ($I_2$=0.75) in the sub-skin layers, C6 LLDPE in the skin layers, and a layer ratio of each skin layer of approximately 17%, showed the best optics as indicated by low haze (6.9%) and high clarity (98.6%) as well as good mechanical strength. When viewed in contrast with comparative example 4, the thin skin layers of Example 1 help to impart improved film transparency to the multilayer film.

Example 2, which is similar to Example 1 with the exception of a lower melt index LDPE ($I_2$=0.25) in the sub-skin layers, also showed excellent optics as indicated by low haze (8.9%) and high clarity (96.6%) as well as good mechanical strength. An LDPE resin with higher melt index in conjunction with a thin skin layer helps to impart improved film transparency to the multilayer film.

It will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these aspects.

The invention claimed is:

1. A multilayer film comprising at least 5 layers, the at least 5 layers comprising a core layer, at least two skin layers, and at least two sub-skin layers disposed between the core layer and the two skin layers, wherein:

the core layer comprises at least 60 wt. % linear low density polyethylene (LLDPE) having a density of 0.900 to 0.945 g/cc and a melt index ($I_2$) from 0.5 to 2.0 g/10 min when measured according to ASTM D1238 at 190° C. and 2.16 kg load;

the sub-skin layers comprise at least 60 wt. % low density polyethylene (LDPE) having a density of 0.912 to 0.935 g/cc, a melt index, $I_2$, from 0.15 to 2.0 g/10 min;

the skin layers comprise at least 80 wt. % LLDPE having a density of from 0.900 to 0.945 g/cc and a melt index, $I_2$, from 0.5 to 2.0 g/10 min, wherein the LLDPE of the skin layers comprise C6 LLDPE, C8 LLDPE, or combinations thereof, wherein each skin layer has a thickness of less than 25% of the overall thickness of the multilayer film;

the multilayer film comprises at least 0.1 wt. % ultraviolet (UV) stabilizer; and the multilayer film exhibits a clarity greater than 95% at an overall thickness of 80 μm.

2. The multilayer film of claim 1 wherein the core layer comprises at least 80 wt. % LLDPE.

3. The multilayer film of claim 1, the core layer, the sub-skin layers, and the skin layers are substantially free of acrylate polymers.

4. The multilayer film of claim 1 wherein the multilayer film is substantially free of propylene-based polymer.

5. The multilayer film of claim 1 wherein the LLDPE of the skin layers or the core layers comprise a density of 0.915 to 0.925 g/cc.

6. The multilayer film of claim 1 wherein the sub-skin layers comprise at least 80 wt. % LDPE, the LDPE having a melt index, $I_2$, from 0.15 to 1.0 g/10 min.

7. The multilayer film of claim 1 wherein the multilayer film comprises from 15 to 50 wt. % LDPE.

8. The multilayer film of claim 1 wherein the multilayer film comprises from 50 to 85 wt. % LLDPE.

9. The multilayer film of claim 1 wherein the overall thickness is from 50 to 150 μm.

10. The multilayer film of claim 1 wherein the multilayer film exhibits a haze less than 10% at an overall thickness of 80 μm as measured according to ASTM D1003.

11. The multilayer film of claim 1 wherein the multilayer film comprises ethylene vinyl acrylate in any layer, an additional layer comprising ethylene vinyl acrylate, or both.

12. The multilayer film of claim 1 further comprising high density polyethylene (HDPE) having a density of 0.945 to 0.965 g/cc and a melt index ($I_2$) from 0.5 to 5.0 g/10 min.

13. The multilayer film of claim 1 further comprising one or more additives selected from the group consisting of antioxidants, UV absorbers, infrared (IR) absorber, anti-fogging agents, and anti-dripping agents.

* * * * *